(No Model.)

W. C. THOMPSON.
GALVANIC BATTERY.

No. 411,400. Patented Sept. 17, 1889.

Witnesses.
A. H. Opsahl.
Emma F. Elmore.

Inventor
William C. Thompson
By his Attorney,
Jas. F. Williamson

N. PETERS, Photo-Lithographer, Washington, D. C.

UNITED STATES PATENT OFFICE.

WILLIAM C. THOMPSON, OF MINNEAPOLIS, MINNESOTA.

GALVANIC BATTERY.

SPECIFICATION forming part of Letters Patent No. 411,400, dated September 17, 1889.

Application filed April 15, 1889. Serial No. 307,257. (No model.)

*To all whom it may concern:*

Be it known that I, WILLIAM C. THOMPSON, a citizen of the United States, and a resident of the city of Minneapolis, county of Hennepin, State of Minnesota, have invented a certain new and useful Improvement in Galvanic Batteries, of which the following is a specification, reference being had to the accompanying drawings.

My invention relates to carbon batteries; and it has for its object to provide a simple construction for connecting the carbon to the cell-cover and at the same time afford an enlarged and more reliable contact with its conductor.

To this end I construct the carbon with an extension adapted to project outward through a hole in the glass cover of the cell. This extension is then fitted with an annular packing of some suitable elastic material—such as rubber—and the wire is connected by an annular metallic clamp fitting over the carbon extension and tightly clamped thereto above and resting upon the packing. The carbon is thus sustained in the cover by the annular contact resting upon the packing on the top of the glass cover, closing the opening therein by a tight joint, and the clamp makes a large and reliable contact between the wire and the carbon.

Figure 1:
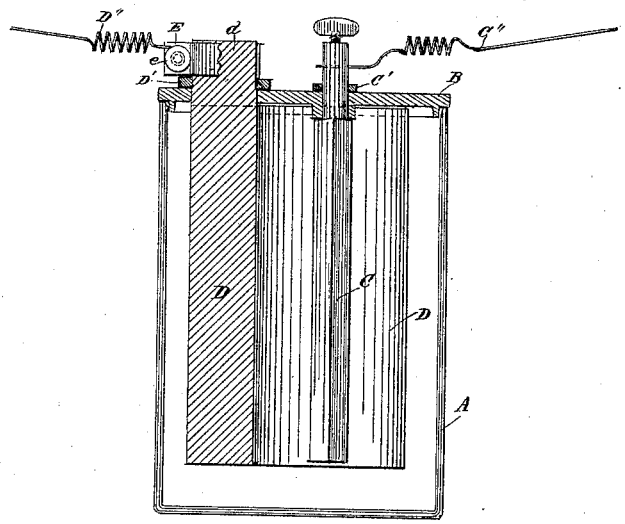
Figure 2:
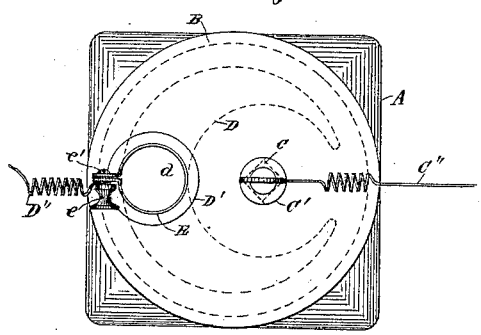

In the drawings, Figure 1 is a transverse vertical section, and Fig. 2 a plan, of a cell embodying my device.

A is the body, and B the glass cover, of the cell. The cover is provided with two openings to permit the outward passage of the zinc and carbon, respectively.

C is a bar of zinc or other suitable metal.

C' is an annular elastic packing on the part of the same above the cover, serving to hold it in position.

C'' is its conductor, connected directly thereto in the customary manner.

D d is the body of carbon, of which d is the extension projecting through one of the openings in the cover.

D' is the annular elastic packing fitting over the extension d above the cover and closing the opening therein.

D'' is the carbon conductor, and E is its contact, in the form of an annular clamp fitting the extension d above the packing D'.

The clamp E is provided with a thumb-nut e, for fastening the conductor, and with a set-screw e', for drawing its parts together and clamping the same tightly to the carbon extension. The set-screw passes loosely through one part of the clamp and works in a thread in the other part, and when the clamp is tightened the point of the screw projects through the clamp and serves as a seat for the thumb-screw, which fits over the same.

The operation and advantages of this construction are evident from the description already given.

I am aware that batteries employing sticks of carbon which are passed through perforations in the cover and are clamped in position by various means are old, and I make no claim thereto; and I am also aware that carbon cylinders bearing metallic band-clamps have heretofore been employed.

What I claim, and desire to secure by Letters Patent of the United States, is as follows:

1. In a carbon battery, the combination, with a removable glass cover having a perforation, of a body of carbon provided with a pole-piece extending outward through said perforation, an elastic packing fitting over said pole-piece and resting on the cover, and an annular metallic contact-clamp over said pole-piece above said packing, substantially as described.

2. In a carbon battery, the combination, with the removable glass cover B, provided with a perforation, of the body of carbon D, provided with the pole-piece d, extending outward through the perforation of the cover, the elastic packing D', the metal band E, clamping-screw e', and thumb-nut e, substantially as described.

3. In a carbon cell, the combination, with a removable cover, of a body of carbon crescent-shaped in cross-section and provided with a pole-piece or projection extending through a perforation in the cover, a metallic contact-clamp attached to said pole-piece, and an elastic packing between said contact-clamp and cover, substantially as described.

WILLIAM C. THOMPSON.

In presence of—
JAS. F. WILLIAMSON,
A. H. OPSAHL.